United States Patent [19]

Messersmith

[11] Patent Number: 4,666,021
[45] Date of Patent: May 19, 1987

[54] RELEASE MECHANISM FOR A HILL HOLDER DEVICE

[75] Inventor: William K. Messersmith, South Bend, Ind.

[73] Assignee: Allied Corporation, Morristown, N.J.

[21] Appl. No.: 782,843

[22] Filed: Sep. 30, 1985

[51] Int. Cl.⁴ .................. F16D 51/00; F16D 65/14; F16D 67/02; G01L 5/28
[52] U.S. Cl. ................................. 188/331; 73/129; 188/181 T; 188/216; 192/3 H; 192/3 TR; 192/13 A
[58] Field of Search .............. 188/1.11, 181 T, 265, 188/353, 328, 331, 346, 216, 72.3; 192/3 H, 13 A, 3 TR; 73/129–131, 862.12, 862.14, 862.19; 340/52 A, 52 B, 69; 303/112

[56] References Cited

U.S. PATENT DOCUMENTS

| | | | |
|---|---|---|---|
| 1,999,947 | 4/1935 | Ross | 73/129 |
| 2,124,960 | 7/1938 | Waring et al. | 188/1.11 X |
| 2,235,412 | 3/1941 | Weiss et al. | 192/3 TR |
| 3,237,526 | 3/1966 | Hayes et al. | 91/376 |
| 3,339,676 | 9/1967 | Quinn | 340/52 A X |
| 3,628,008 | 12/1971 | Lacey | 340/52 A |
| 3,689,121 | 9/1972 | Kawabe et al. | 303/112 |
| 4,093,050 | 6/1978 | Mizuno | 192/3 TR |
| 4,129,202 | 12/1978 | Winters et al. | 188/181 T |
| 4,440,279 | 4/1984 | Schreiner | 188/1.11 X |
| 4,582,184 | 4/1986 | Taig et al. | 192/13 A |

Primary Examiner—Andres Kashnikow
Assistant Examiner—Robert J. Oberleitner
Attorney, Agent, or Firm—Larry J. Palguta; Ken C. Decker

[57] ABSTRACT

The improved release mechanism comprises a load sensor (50, 51, 150, 250, 350, 450) connected with a wheel brake (10, 110) to sense a change in wheel braking torque and communicate responsively with a mechanical brake control device (200) or a braking assistance servo-motor system (310, 320; 410, 420) which releases the brakes when the vehicle commences acceleration along an incline.

4 Claims, 7 Drawing Figures

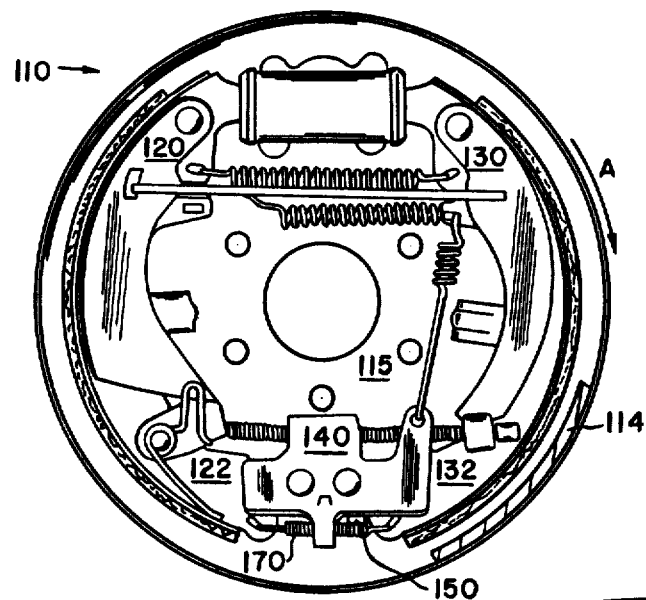
FIG. 3
FIG. 4
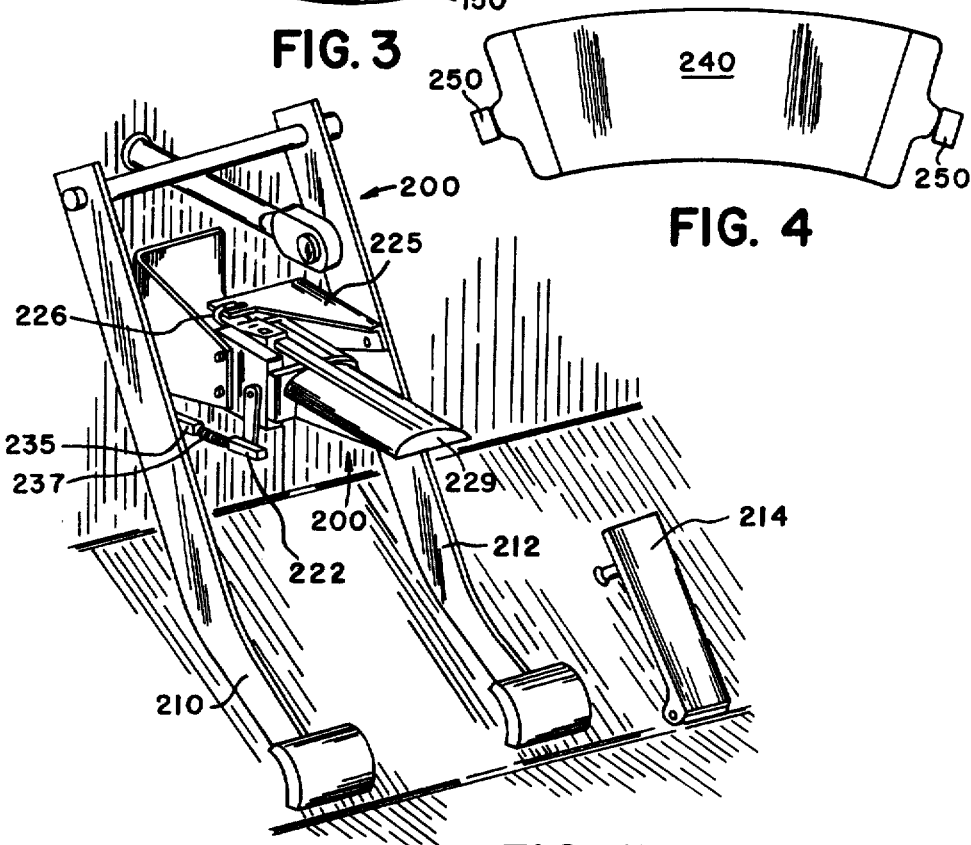
FIG. 5

RELEASE MECHANISM FOR A HILL HOLDER DEVICE

The present invention comprises an improved release mechanism for a hill holder device, the hill holder device being either a mechanical brake control device or a braking assistance servo-motor system, each being operable to maintain the brake pedal in the applied position under certain predetermined circumstances.

In a vehicle having a clutch pedal and a brake pedal, a hill holder device is utilized to maintain the brake pedal in the applied position so that the vehicle operator's foot is free to operate the accelerator pedal. A mechanical brake control device may be disposed between the clutch and brake pedals, with the clutch pedal connected by a linkage to the brake control device so that release of the clutch pedal will cause deactuation of the brake control device and result in release of the brake pedal from the applied position. A braking assistance servo-motor system operates to maintain the brake in the applied position wherein a control circuit has a clutch switch operable responsively to clutch pedal position to provide input to the control circuit and effect the actuation or deactuation of valve means coupled to the booster mechanism. Again, a change in clutch pedal position, along with other parameters, is utilized to effect actuation or deactuation of the booster and either maintain or release the brakes from the applied position. It is desirable to provide a release mechanism that will effect release of the brakes at the exact moment when the vehicle drive train applies adequate torque to move the vehicle along the inclined surface. The release mechanism should be usable with either a mechanical brake control device or a braking assistance servo-motor system.

The present invention provides a wheel braking torque sensor disposed within a wheel brake so that when the vehicle is accelerated and effects corresponding wheel braking torque changes within the brake, the change in torque is sensed and provides an input to either a solenoid connected with the mechanical brake control device or to the control circuit connected to the braking assistance servo-motor in order to effect operatively a release of the brakes from the applied position to a released position and permit movement of the vehicle.

The invention provides an improved release mechanism for mechanical brake control device in a vehicle having a brake pedal and a clutch pedal, the brake pedal being movable from a rest position to an applied position during braking, the clutch pedal being movable from a rest position to an applied position when the associated clutch assembly is disengaged, the mechanical brake control device being operatively connected with the brake pedal for actuation thereby and including means for opposing movement of the brake pedal away from the applied position in order to retain the brake pedal in said applied position, and a release mechanism operatively coupled with said brake control device for effecting operation of the brake control device and a subsequent release of the brake pedal from the applied position, wherein the release mechanism comprises braking torque sensor means for sensing a change in braking wheel torque when the vehicle begins movement and effects a change in the braking torque, and actuation means coupled to the brake control device and responsive to said sensor means in order to effect release of the brake pedal from the applied position.

The invention provides an improved release mechanism for a braking assistance servo-motor system in a vehicle having a brake pedal/clutch pedal, wherein the system is operable to maintain the braking of the vehicle when the brake pedal is released toward an inactive braking position and the system comprises a brake booster including output means for operatively actuating the brakes of the vehicle, valve means operatively connected with the booster, and control circuit means for sensing vehicular parameters and operatively connected to the valve means, the brake booster operating responsively to the brake pedal by utilizing a pressure differential to displace the output means and actuate the brakes, the control circuit means sensing the parameters of the vehicular attitude and vehicular speed to actuate responsively thereto the valve means and provide fluid pressure to the brake booster and maintain displacement of the output means and actuation of the brakes after the brake pedal has been released, wherein the release mechanism comprises sensor means disposed within the wheel brake and for sensing a change in wheel braking torque when the vehicle commences movement so that the sensor means transmits a signal to the control circuit means to cause operative deactuation of the valve means and permit said brake pedal to be released toward an inactive braking position.

The present invention may also be utilized in a braking assistance servo-motor system operable to maintain a braking of the vehicle when the brake pedal is released toward an inactive braking position, which system including a brake booster having a first chamber, a working chamber, first valve means responsive to the brake pedal, output means for operatively actuating brakes of the vehicle, and second valve means operatively connected to the booster, and control circuit means for sensing vehicular parameters and operatively connected to the second valve means, the brake booster operating responsively to the brake pedal and utilizing a pressure differential between the chambers to displace the output means and actuate the brakes, the control circuit means sensing parameters of vehicular attitude including clutch position to actuate responsively thereto the second valve means and maintain displacement of the output means and actuation of the brakes after the brake pedal has been released, wherein the release mechanism comprises sensor means for sensing a change in wheel braking torque when the vehicle commences movement so that the sensor means transmits a signal to the control circuit means to cause deactuation of the second valve means and release of the output means for return to an at-rest position.

The invention is described in detail below with reference to the drawings which illustrate the embodiments of the invention, in which:

FIG. 3 illustrates a non-servo brake having a torque sensor of the present invention;

FIG. 4 illustrates the location of a load or torque sensor adjacent a brake pad of a disc brake;

FIG. 5 illustrates a mechanical brake control device which operates responsively to the torque sensor of the present invention;

The purpose of the present invention is to provide a means for sensing precisely a change in wheel braking torque so that at the instant the vehicle's drive train applies sufficient torque to the driven vehicle wheels to move the vehicle along an inclined surface upon which the vehicle is disposed, the sensed change in wheel braking torque is utilized to cause either a mechanical braking control system or braking assistance servo-motor system to release the brakes which have been holding the vehicle stationary on the inclined surface. Thus, the present invention may be utilized within numerous types of brakes, i.e., non-servo brakes, servo brakes, and disc brakes, and in conjunction with various types of hill holder control devices. The location of the torque sensor will be described with reference to the various types of brakes, and then the utilization of the torque sensor with the mechanical brake control device or braking assistance servo-motor systems will be described in detail.

Figure 1:
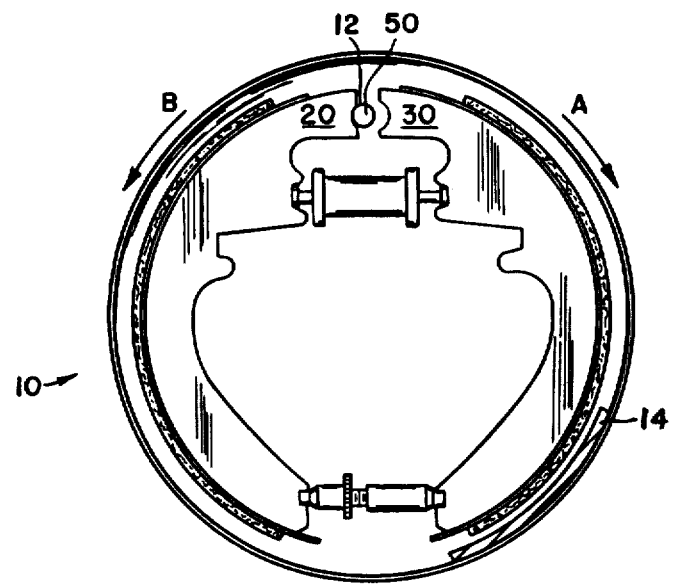
FIG. 1 is a schematic representation of a servo brake with the torque sensor of the present invention.

Referring to FIG. 1, the wheel braking torque sensor may comprise one of numerous types of sensors, i.e., contact point, piezo-electric sensor or any other type of suitable load sensor which will provide an output signal in response to a change in the loads imposed upon the sensor. In this case, the loads imposed upon the sensor are those created by wheel braking torque, i.e. when the vehicle is positioned upon an inclined surface and a vehicular hill-holding system is maintaining the vehicle in position so that the vehicle operator's foot is free to move from the brake pedal to the accelerator pedal, the brakes experience a wheel-braking torque caused by gravitational pull exerted upon the vehicle and directed down the incline.

FIG. 1 is a schematic representation of a servo brake, in accordance with many of the various types of well-known servo brakes. Many of the parts have been eliminated in order to provide a clear representation of the present invention. As illustrated in FIG. 1, the schematic representation of a servo brake 10 shows an anchor pin 12 disposed between the ends 20, 30 of the brake shoes. The load sensor 50 is disposed entirely within the anchor pin (see FIG. 1) so that during braking (when the vehicle may be disposed on an inclined surface and the drum rotates slightly the brake shoes in the direction of Arrow A), the brake shoe end 20 engages and exerts a predetermined force upon anchor pin 12 and load sensor 50. Likewise, when the vehicle is parked on an incline in the opposite direction, the braking torque causes the brake shoes to be rotated in the direction of Arrow B so that shoe end 30 would engage the sensor and exert a predetermined load thereon. When it is desired to cease braking and accelerate the vehicle along the inclined surface, the operator merely accelerates the vehicle which causes the drive train to exert a force counter to the direction the wheels were tending to turn due to gravitational pull. Thus, wheel brake drum 14 will move in the opposite direction (Arrow B) and move brake shoe end 20 away from the load sensor 50. This change in wheel braking torque is sensed by load sensor 50 which emits a signal to the operatively attached mechanical brake control device or braking assistance servo-motor system and causes the device or system to deactuate and release the brakes so that the vehicle may accelerate forward.

Figure 2:
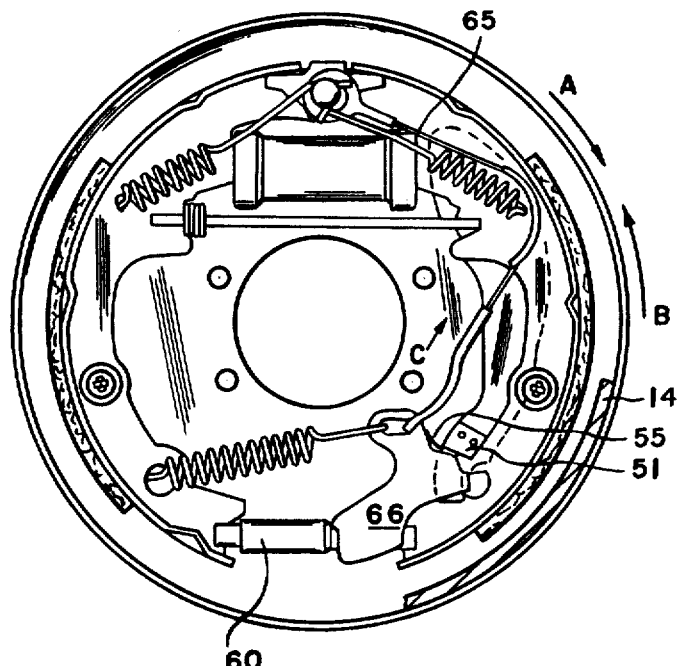
FIG. 2 illustrates a servo brake having an brake pad wear adjusting device and a torque sensor of the present invention.

It should be apparent that the wheel braking torque sensor may be located in numerous positions relative to the wheel brake, or at positions adjacent the wheel brake in order to sense a change in wheel braking torque. FIG. 2 illustrates a schematic representation of a servo brake similar to that in FIG. 1, with the addition of the adjusting lever and attached cable which operates the adjustable strut 60 that compensates for brake shoe lining wear. When the vehicle is braked and is being maintained on the inclined surface by the hill-holder device or system, the wheel drum 14 exerts braking torque in the direction of Arrow A upon the brake shoes and causes them to rotate in the clockwise direction of Arrow A. The cable 65 pulls the adjuster lever 66 slightly upwardly which moves the arm 55 of the sensor 51 (mounted on the shoe web) slightly along the direction of Arrow C. It should be clearly understood that the brake lining wear adjuster device 60 and lever 66 are well known by those skilled in the art and operate in conventional manner, and that the sensor 51 can be mounted at several suitable locations. When the vehicle operator accelerates the vehicle, the change in wheel torque will cause the brake shoes to rotate slightly in the direction of Arrow B which causes the sensor arm 55 to move slightly in a direction opposite Arrow C and effect an output signal which is transmitted to the hill holder system and causes release of the brakes.

FIG. 3 illustrates a typical non-servo brake 110 having a drum 114 engaged by brake shoes 120 and 130 during braking. The anchor block 140 receives and anchors shoe ends 122 and 132 which are biased inwardly by spring 170. The torque sensor 150 may be attached to anchor block 140 or backing plate 115 and located adjacent either shoe end 122 or 132. When the vehicle is braked on an inclined surface, wheel drum 114 exerts an additional braking torque in the direction of Arrow A upon the brake shoes 120, 130 and this braking torque is imposed upon load sensor 150. When the vehicle operator accelerates the vehicle, the change in wheel torque causes the brake shoes to move slightly opposite Arrow A and the change in wheel braking torque is sensed by load sensor 150 which emits a signal that operatively deactuates the associated hill-holder system to release the brakes.

Turning to FIG. 4, there is illustrated a typical disc brake pad 240 which is supported by either the torque support plate or caliper of the disc brake. A torque sensor 250 may be located at either one or both of the ends of the disc brake pad. When the vehicle is located upon an incline and the hill holder system is maintaining the position of the vehicle, the rotor will exert (due to gravitation) a torque on the disc brake pads and cause them to exert a wheel braking force upon a sensor 250 and support mechanism that maintains the pads in place for braking. The torque sensor 250 will sense this wheel braking torque, and likewise, as described above, when the operator accelerates the vehicle the resulting sudden drop in wheel braking torque is sensed by sensor 250 which emits a signal to the hill-holder system and causes the system to release the brakes for movement of the vehicle.

It should be apparent from the above descriptions that the torque sensor may comprise any one of various types of sensor devices and may be placed in a number of positions in relation to the wheel brake in order to sense the change in wheel braking torque that occurs when the vehicle operator accelerates the vehicle. Thus, the sudden change in wheel braking torque is sensed by the braking torque sensor which emits a signal to the appropriate operatively attached hill-holder system which effects release of the wheel brake so that the vehicle may commence movement.

FIG. 5 illustrates a mechanical brake control device which operates responsively to any one of the torque sensors described above. The brake control device is designated generally by reference numeral 200 and is disposed between the brake pedal 212 and clutch pedal 210. An accelerator 214 controls the engine speed. A bracket is secured to the vehicle by suitable means and the bracket disposes the brake control device 200 between the brake pedal 212 and clutch pedal 210. A control linkage 222 extends between device 200 and solenoid 235, and a connecting bracket 225 extends between a connecting member 226 and brake pedal 212. The connecting bracket 225 is secured in a limited manner to connecting member 226 extending through the device 200. A cover 229 encloses the connecting member 226 in the direction of the vehicle operator. The mechanical brake control device 200 is disclosed and described in greater detail in co-pending U.S. patent application Ser. No. 706,210; and U.S. Pat. Nos. 4,533,028; 4,538,710; and 4,611,696, 4,582,184 each patent application and Patent being incorporated by reference herein. Each of the mechanical control devices described by the co-pending applications and patent utilize a ball and wedge assembly to maintain the brake pedal in an applied position whenever the vehicle is disposed upon an incline and the brake pedal and the clutch pedal depressed. However, in the present application the control linkage 222 is connected to the solenoid 235 (not connected to clutch pedal 210) which operates responsively to any one of the load sensors described above. When the load sensor senses a predetermined magnitude of braking torque, the solenoid is energized and will retract linkage 222, and if the vehicle is on an incline, the ball will move into wedging position and lock the connecting member 226 to the housing of device 200. When the load sensor senses a change in wheel braking torque as the vehicle is accelerated, the solenoid 235 is deactuated and permits the linkage 222 to return to its illustrated position, this causing the mechanical brake control device to deactuate and release the brake pedal. The operation is similar to the operation when linkage 222 is connected to the clutch pedal as described in the co-pending patent applications and Patent. The vehicle operator has additional flexibility in that when the brake control device 200 maintains the brake pedal in the applied condition under the appropriate circumstances, and the vehicle operator's right foot is free to move from the brake pedal 212, if the vehicle gears are placed in neutral the vehicle operator may release the clutch pedal which is not connected to the control device 200. Thus, both feet may be removed from the clutch and brake pedals without deactuating the brake control device. It is the torque applied by the engine via clutch engagement to the driven axle that causes a change in wheel braking torque, the change in torque being sensed and operatively causing a deactuation of solenoid 235 which allows a spring 237 to return the linkage 222 that deactuates control device 200 and releases brake pedal 212 so that the vehicle may move along the incline.

Figure 6:
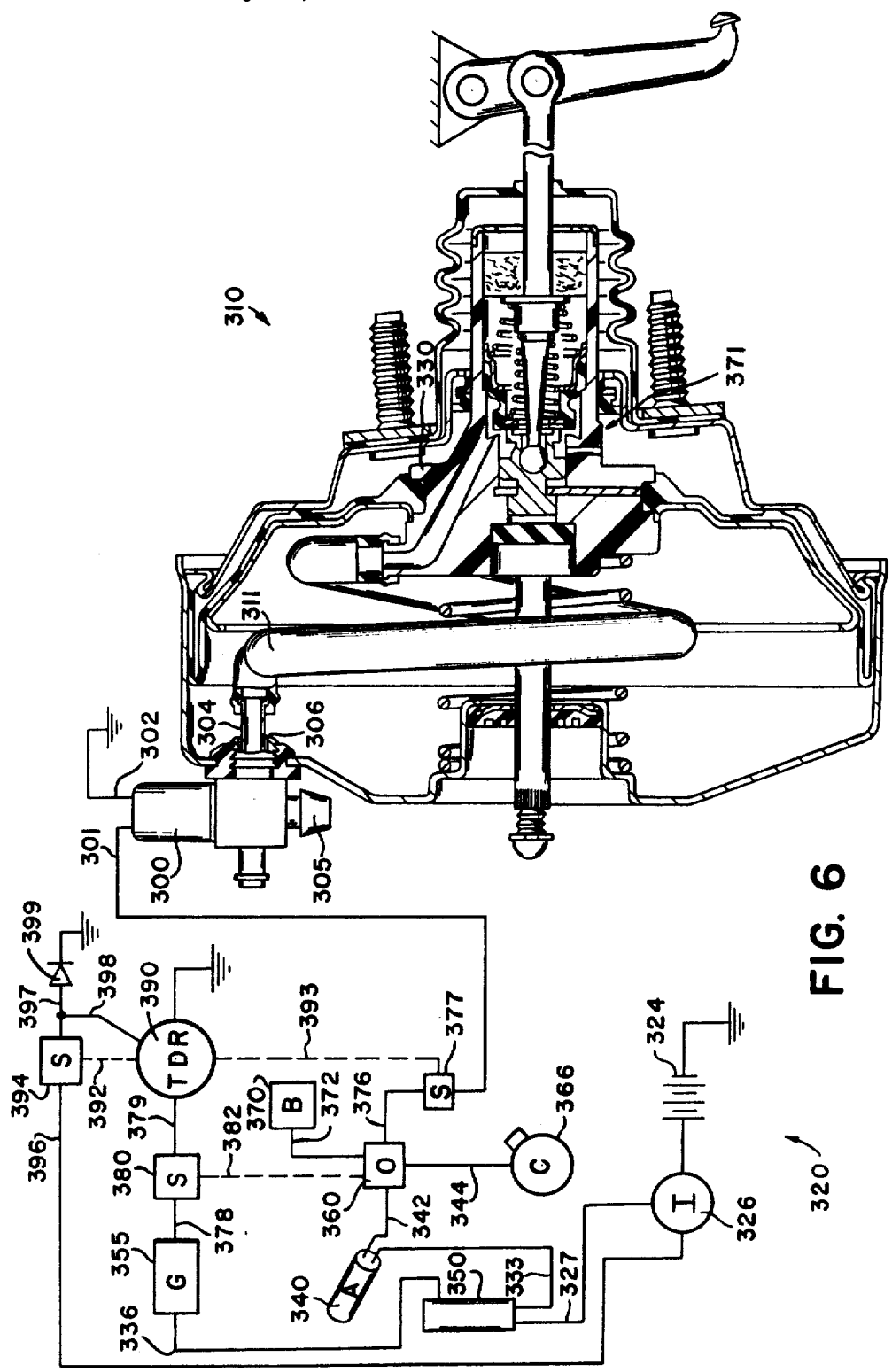
FIG. 6 illustrates the torque sensor of the present invention located within the control circuit of a braking assistance servo-motor system.

Turning to FIG. 6, there is illustrated a wheel torque sensor 350 located in a control circuit 320 attached to the three-way combination valve 300 connected to booster 310. The braking assistance servo-motor system illustrated in FIG. 6 is described in greater detail in co-pending patent application Ser. Nos. 642,618 and 642,619, each being incorporated by reference herein. The combination valve 300 is mounted to the front shell of the booster 310 purely as a matter of convenience. Valve 300 may be mounted in various other locations within the vehicle and need not be mounted directly to the front shell. Combination valve 300 comprises the combination of a check valve and three-way solenoid valve. The solenoid valve is connected by wires 301, 302 to the control circuit 320. An air cleaner 305 is located at the bottom of valve 300 which has an input connection extending into the front chamber of booster 310. Referring to control circuit 320, the wheel torque sensor 350 provides an output in accordance with wheel torque sensed thereby, and sensor 350 may comprise any one of the above-described sensors. As described above, when the vehicle operator accelerates the vehicle, the change in wheel braking torque is sensed and transmitted to the appropriate hill holder device or system. In this case, the change in braking torque that occurs when the vehicle is accelerated results in sensor 350 effecting an output through line 336 to the "in gear" switch 355. When the vehicle is braked on an incline, torque sensor 350 provides an output through line 333 connected in series with the vehicle attitude switch 340. Vehicle attitude switch 340 may comprise any type of conventional mercury level switch or other device which will provide a switch closure when the vehicle is situated at a predetermined angle. Line 342 connects attitude switch 340 with the zero speed sensor 360. Vehicle zero speed sensor 360 comprises a sensor which receives inputs indicative of the vehicle's direction of movement and whether or not the vehicle is moving or stationary. The vehicle's backup light switch 370 provides an electrical output through line 372 so that if the vehicle is backing up, a signal is relayed via line 372 to zero speed sensor 360 whereby an operative output signal is not effected by sensor 360. In other words, back-up light switch 370 provides a "defeat" instruction to zero speed sensor 360. A cruise control transducer 366 normally utilized in conjunction with the speedometer cable of the vehicle, provides an indication of whether or not the vehicle is moving. The cruise control transducer 366 provides a pulse output to the vehicles cruise control device (not shown), and it is the pulse output which is used also as an output signal through line 344 to zero speed senor 360. When an electrical pulse output from transducer 366 is received by speed sensor 360, the sensor will not provide an output for operation of the combination valve 300. Zero speed sensor 360 is connected by line 376 to time delay switch 377 which is connected via line 301 to the valve 300.

Turning to another branch of circuit 320, the "in gear" switch 355 comprises a switch in the gear housing of the vehicle, which is closed whenever the vehicle is "in gear", whether stationary or moving. Switch 355 is connected via line 378 to a zero speed switch 380 coupled by mechanical connection 382 to zero speed switch 360. If zero speed sensor 360 does not receive inputs from back-up light switch 370 and cruise control transducer 366, then an output to line 376 is effected by sensor 360 and zero speed sensor 380 is closed. However, if zero speed sensor 360 receives an input from either switch 370 or transducer 366, then zero speed switch 380 is opened so that an electrical signal will not pass through from line 378 to line 379. Zero speed switch 380 is connected by line 379 to a time delay relay 390. Time delay relay 390 is conventional device that delays any output signal for a period of approximately ten seconds. Relay 390 is connected: (1) by mechanical connection 392 to a time delay switch 394 located between line connection 396 and 397, (2) by mechanical connection 393 to delay switch 377, and (3) by line 398 to line 397. The ignition switch 326 is connected by line 396 to time delay switch 394 so that when the switch 394 is closed, an output is permitted through line 397 to a warning light 399 and to line 398 for transmission to relay 390. Warning light 399 may be a standard LED or other suitable luminant visible to the vehicle operator.

Valve 300 has input connection 304 communicating with conduit 311 coupled to central hub 330 which has therein a standard poppet valve 371 well-known in the art. Valve 300 provides continuous vacuum through circumferential passages 306 to the front booster chamber, valve 300 being connected to the intake manifold. When the vehicle is braked on an incline, circuit 320 operates valve 300 so that atmospheric pressure, instead of vacuum pressure, is provided through conduit 310 to the rear booster chamber via poppet valve 371 so that the booster remains in the actuated position when the vehicle operator releases the brake pedal (which would normally deactuate booster 310). Thus, booster 310 may comprise any booster structure that permits the communication of atmospheric pressure by valve 300 to the rear working chamber in order to maintain the actuated position of the booster's movable diaphragm when the vehicle operator has released the brake pedal and deactuated poppet valve 371. The booster 310 remains actuated until the signal from control circuit 320 ceases and effects deactuation of valve 300 which then again provides vacuum pressure through conduit 311.

Circuit 320 operates in response to a variety of circumstances or situations in order to determine if combination valve 300 should operate and provide continued braking of the vehicle so that the vehicle operator may release the brake pedal without effecting the release of the vehicle brakes. The circuit operates in the same manner as described in co-pending Serial application Nos. 642,618 and 642,619 incorporated by reference herein, except that the circuit utilizes the signal of the wheel torque sensor 350 instead of the clutch switch described previously in the cited co-pending Applications. Thus, the wheel braking torque sensor 350 senses a change in wheel braking torque and effects a signal through line 336 that causes the hill holder servo-motor system to deactuate and allow the vehicle to accelerate forward, while the lack of a change in wheel braking torque results in a signal through line 333 which permits the servo-motor system to operate the brakes and hold the vehicle in a stationary position on the incline. Operation of the servo-motor system would be in accordance with the operation described in the cited co-pending applications, except for the fact that a change in the wheel braking torque is sensed by the braking torque sensor as an input to the system instead of the clutch pedal switch which has been eliminated from the system.

Figure 7:
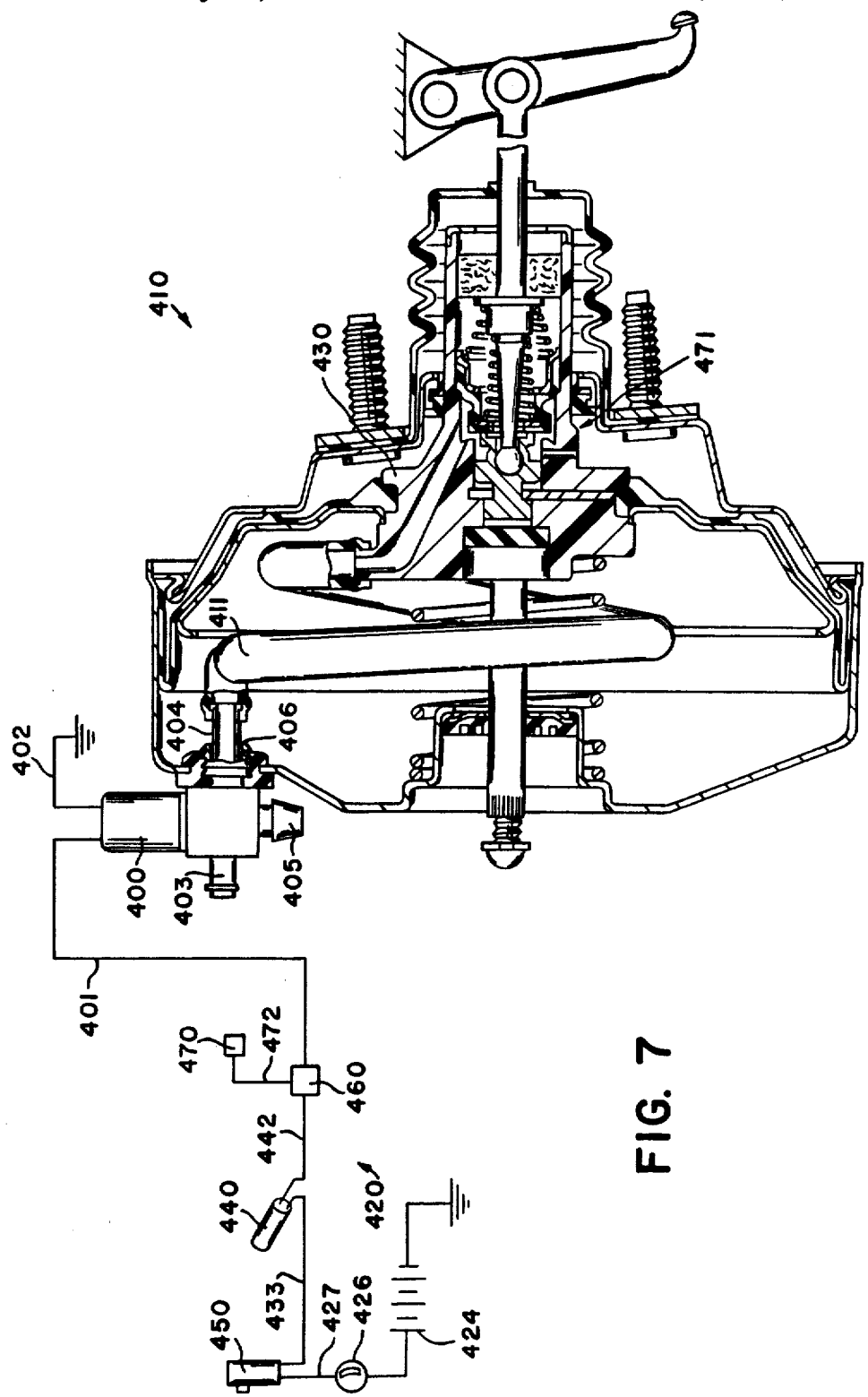
FIG. 7 illustrates the torque sensor of the present invention located within the control circuit of an alternative braking assistance servo-motor system.

Referring to FIG. 7, there is illustrated a control circuit and vacuum booster similar to that described in co-pending patent application No. 729,392, incorporated by reference herein. A combination two-way valve 400 is mounted to a booster 410. Combination valve 400 comprises the combination of a check valve and two-way solenoid valve, as disclosed in further detail in copending Ser. No. 729,392. The solenoid valve is connected by wires 401, 402 to control circuit 420, and nozzle 403 is connected to a vacuum source. Control circuit 420 includes a connection from the vehicle battery 424 to the ignition switch 426 coupled by wire 427 to the torque sensor 450. Torque sensor 450 may comprise any one of the torque sensors described in detail above. Torque sensor 450 is connected to line 433 and attitude switch 440. Line 442 connects attitude switch 440 with the vehicle back-up light switch 470 that provides an electrical output through line 472 so that if the vehicle is backing up, a signal is relayed via line 472 to main switch 460 whereby an operative output signal is not permitted by main switch 460. In other words, back-up light switch 470 provides a "defeat" instruction to switch 460. Circuit 420 operates in response to certain predetermined vehicular parameters in order to determine if combination valve 400 should operate and maintain braking of the vehicle so that the vehicle operator may release the brake pedal without effecting release of the vehicle brakes.

Input connection 404 is connected to conduit 411 coupled to control hub 430 which has therein a standard poppet valve 471 well known in the art. Valve 400 provides continuously vacuum through circumferential passages 406 to the front booster chamber, valve 400 being connected to the intake manifold. When the vehicle is braked on an incline and atmosphere introduced through poppet valve 471 to the rear booster chamber in the usual manner, circuit 420 will operate to close valve 400 so that vacuum is no longer provided to conduit 411. When the vehicle operator removes his foot from the brake pedal and deactuates poppet valve 471, atmospheric pressure in the rear booster chamber is not evacuated through conduit 422 because of the closed two-way valve 400. Thus, operation of valve 400 effectively maintains the atmospheric pressure introduced into the rear booster chamber during actuation of the braking system.

The torque sensor 450 senses a change in wheel braking torque when the operator accelerates the vehicle, and thus terminates an output through line 433 so that the circuit deactuates combination control valve 400 which evacuates atmospheric pressure through conduit 411 and causes release of the brakes. Brake booster 410 and control circuit 420 operate in accordance as disclosed in co-pending Ser. No. 729,392, in that when the vehicle operator's foot is removed from the brake pedal, under appropriate circumstances the control circuit operates and the two-way combination control valve 400 maintains the booster in the applied position by maintaining the atmospheric pressure existing in the rear chamber of the booster 410. The control circuit 420 of the present invention includes control torque sensor 450 instead of a clutch switch. Torque sensor 450 permits a signal through line 433 when there is no change in wheel braking torque corresponding to acceleration of the vehicle, so that the vehicle braking assistance servomotor system will operate and permit the vehicle to experience continued braking on an incline even though the operator has removed his foot from the brake pedal. Upon acceleration of the vehicle, the change in wheel braking torque is sensed by sensor 450 which effects a termination of the signal through line 433 and causes the combination valve 400 to deactuate and evacuate the atmospheric pressure maintained in the rear chamber of the booster 410, thereby allowing the brakes to be released and the vehicle to accelerate along the incline.

Although the present invention has been illustrated and described in connection with example embodiments, it will be understood that this is illustrative of the invention, and is by no means restrictive thereof. It is reasonably to be expected that those skilled in the art can make numerous revisions and additions to the invention and it is intended that such revisions and additions will be included in the scope of the following claims as equivalents of the invention.

I claim:

1. An improved release mechanism for a mechanical brake control device in a vehicle having a brake pedal and a clutch pedal, the brake pedal being movable from a rest position to an applied position during braking, the clutch pedal being movable from a rest position to an applied position and causing an associated clutch assembly to be disengaged, the mechanical brake control device being operatively connected with the brake pedal for actuation thereby and including means for opposing movement of the brake pedal away from the applied position in order to retain the brake pedal in said applied position, and a release mechanism operatively coupled with said brake control device for effecting operation of the brake control device and a subsequent release of the brake pedal from the applied position, characterized in that said release mechanism comprises braking torque sensor means for sensing a change in braking wheel torque when the vehicle begins movement and effects a change in braking torque, and actuation means coupled to said brake control device and responsive to said sensor means in order to effect a release of the brake pedal from said applied position, said braking torque sensor means comprising a sensor located within a wheel drum brake to sense a change in braking torque when the vehicle commences movement, the sensor means providing an input signal to the actuation means which operatively effects release of said brake pedal, and said sensor means incorporated entirely within an anchor pin engagable directly by brake shoes of the drum brake, the sensor means providing a signal responsively to changes in braking torque resulting from movement of the vehicle.

2. The improved release mechanism in accordance with claim 1, wherein said sensor detects a decrease in braking torque when said vehicle commences movement in a forward direction.

3. The improved release mechanism in accordance with claim 1, wherein said sensor means detects an increase in braking torque.

4. The improved release mechanism in accordance with claim 1, wherein said actuation means comprises a solenoid operatively connected to said brake control device to effect actuation thereof and release of said brake pedal when said sensor means senses a change in wheel braking torque.

* * * * *